United States Patent
Aliberti

(10) Patent No.: US 8,708,525 B2
(45) Date of Patent: Apr. 29, 2014

(54) LIGHT EMITTING DIODE LIGHT BULB AND INCANDESCENT LAMP CONVERSION APPARATUS

(75) Inventor: James Aliberti, North Attleboro, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/366,091

(22) Filed: Feb. 3, 2012

(65) Prior Publication Data

US 2012/0224374 A1 Sep. 6, 2012

Related U.S. Application Data

(60) Provisional application No. 61/448,496, filed on Mar. 2, 2011.

(51) Int. Cl.
*F21V 29/00* (2006.01)
*H01R 13/00* (2006.01)
*H05B 37/00* (2006.01)

(52) U.S. Cl.
USPC .............. 362/249.02; 362/249.01; 315/362

(58) Field of Classification Search
CPC .......... F21Y 2101/02; F21Y 2103/022; H01L 33/648; G02B 6/009
USPC .............. 362/249.02, 294, 249.01; 315/159, 315/185 R, 362; 313/46, 318.04
See application file for complete search history.

(56) References Cited

U.S. PATENT DOCUMENTS

| | | | |
|---|---|---|---|
| 7,892,000 B1 * | 2/2011 | Yen | 439/236 |
| 7,911,118 B2 | 3/2011 | Rooymans | |
| 7,956,546 B2 * | 6/2011 | Hasnain | 315/200 R |
| 2005/0231964 A1 | 10/2005 | Tufano et al. | |
| 2007/0268687 A1 * | 11/2007 | Scannell | 362/154 |
| 2008/0293290 A1 | 11/2008 | Ku et al. | |
| 2010/0051976 A1 | 3/2010 | Rooymans | |
| 2011/0163678 A1 * | 7/2011 | Shew | 315/159 |

FOREIGN PATENT DOCUMENTS

| | | |
|---|---|---|
| KR | 10-2007-0118171 | 12/2007 |
| KR | 10-2010-0010321 | 2/2010 |
| WO | 2010-031723 | 3/2010 |

OTHER PUBLICATIONS

PCT Search Report mailed Oct. 18, 2012.

* cited by examiner

*Primary Examiner* — Tracie Y Green
(74) *Attorney, Agent, or Firm* — William B. Kempler; Wade J. Brady, III; Frederick J. Telecky, Jr.

(57) ABSTRACT

Apparatus and methods separate the functions of light emission, heat dissipation, and power conversion in LED lighting. Doing so may facilitate cost-effective LED lighting and enable the conversion of existing incandescent lamps to LED service. An LED light bulb includes a thermal path from LED dies to a thermal transfer contact having an externally available surface. The LED light bulb and an incandescent lamp adapter are consumer-installable in an incandescent lamp. A heat spreader component of the lamp adapter contacts the thermal transfer contact of the LED light bulb to dissipate heat originating at the LED dies. A lamp adaptable LED power supply plugs into a standard AC power outlet and includes a receptacle to accept insertion of a lamp cord plug to deliver power to the LED light bulb. A lock-in safety device prevents retraction of the lamp cord plug from the LED power supply once inserted.

6 Claims, 6 Drawing Sheets

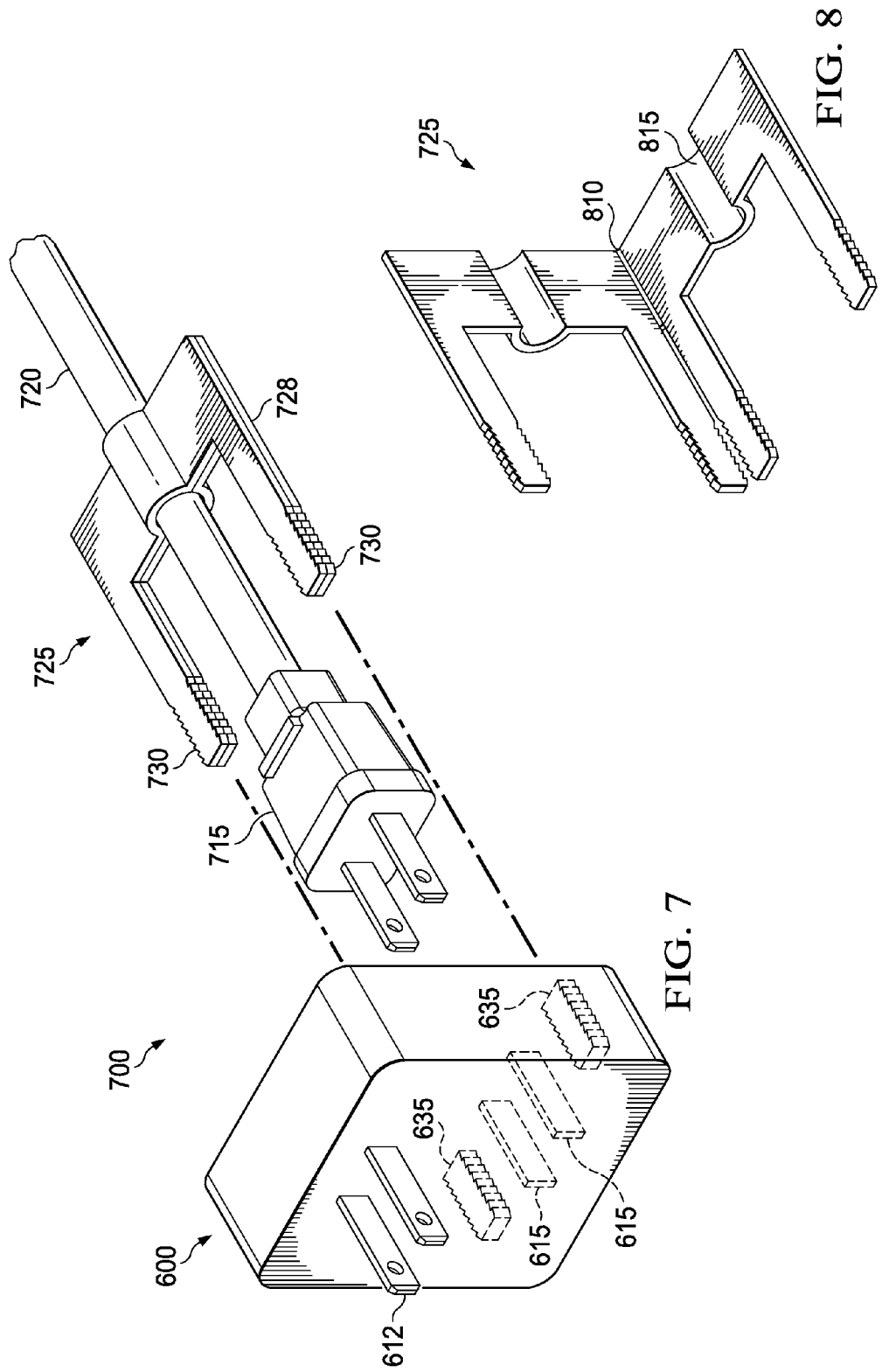

LIGHT EMITTING DIODE LIGHT BULB AND INCANDESCENT LAMP CONVERSION APPARATUS

PRIORITY CLAIM

This application claims the benefit of priority under 35 U.S.C. §119(e) to U.S. Provisional Patent Application Ser. No. 61/448,496 titled "Incandescent Lamp to LED Lighting Lamp Conversion," filed on Mar. 2, 2011 and incorporated herein by reference in its entirety.

TECHNICAL FIELD

Embodiments described herein relate to ambient space lighting apparatus, including structures and methods associated with light-emitting diode (LED)-based light bulbs, apparatus to adapt LED light bulbs to incandescent lamps, and associated power supplies.

BACKGROUND INFORMATION

Power handling capabilities, power-to-lumen efficiencies, and production costs of LEDs have improved over the past few years. Consequently, LED-based ambient lighting has become practical and has begun to compete with compact fluorescent lighting (CFL) technologies as a replacement for power-hungry incandescent lighting.

Challenges to LED lighting include power conversion and heat dissipation requirements. LED arrays typically require low-voltage direct current (DC) and are driven by residential voltage alternating current (AC) to constant current DC power supplies. Light conversion in incandescent bulbs occurs along the filament. Heat from the unconverted power is dissipated from the filament and down through the filament support elements connecting the filament to the base. Light conversion in CFL bulbs occurs via luminescence across a substantial percentage of the interior surface area of the bulb. Heat from unconverted power in the CFL case is generated by the associated mercury vapor discharge process throughout the interior of the bulb and by the ballast circuitry at the base. In the cases of both incandescent and CFL bulbs, waste heat is generated and conducted across relatively large surface areas.

In contrast, a power LED useful for ambient lighting emits light and produces heat across a millimeter-scale semiconductor die surface, resulting in a very high heat flux (watts per unit area). The power efficacy in lumens per watt is much higher for LED lighting as compared to incandescent and is beginning to outpace the efficacy of CFL bulbs. Said differently, LED lighting produces less heat per lumen than the other two technologies. However, the high heat flux resulting from the very small emission surfaces associated with LED dies creates a considerable waste heat removal problem. Consequently, commercially available direct-replacement LED bulbs typically include bulky, complex heat dissipation elements as well as AC to constant current DC internal power supplies. The incorporation of these support apparatus into each LED light bulb currently disadvantages LED lighting's initial cost to performance ratio as compared to that of older technologies.

BRIEF DESCRIPTION OF THE DRAWINGS

FIG. 7 illustrates a lamp adapter LED power supply assembly according to various example embodiments.

FIG. 8 illustrates a lamp plug lock-in device according to various example embodiments.

SUMMARY OF THE INVENTION

Embodiments herein separate the functions of light emission, heat dissipation, and power conversion in LED lighting. Doing so may facilitate production of a cost-effective LED light bulb and enable the conversion of existing incandescent lamp lighting to LED lighting service.

Embodiments of an LED light bulb herein disclosed include thermal paths from LED dies mounted in LED packages to an integrated thermal transfer contact having an externally available surface. The LED light bulb is consumer-installable in a female end of an incandescent lamp adapter. The lamp adapter includes an industry-standard lamp bulb base and is thus capable of being installed in an incandescent lamp as though it were an incandescent light bulb. The lamp adapter also includes a heat spreader. With the LED light bulb installed in the lamp adapter, the heat spreader contacts the light bulb's thermal transfer contact and dissipates heat originating at the LED dies.

Some embodiments may also include a lamp adaptable LED power supply. The LED power supply plugs into a standard AC power outlet and provides power suitable for the particular technology associated with the LED dies integrated into the LED light bulb. The LED power supply includes a receptacle into which a lamp cord plug from the LED-converted lamp may be inserted. A lock-in device prevents retraction of the lamp cord plug from the LED power supply, once inserted. The lock-in device helps to ensure that the lamp, once converted for use as an LED lamp, is not inadvertently plugged into a standard AC power outlet.

DETAILED DESCRIPTION

Figure 1:
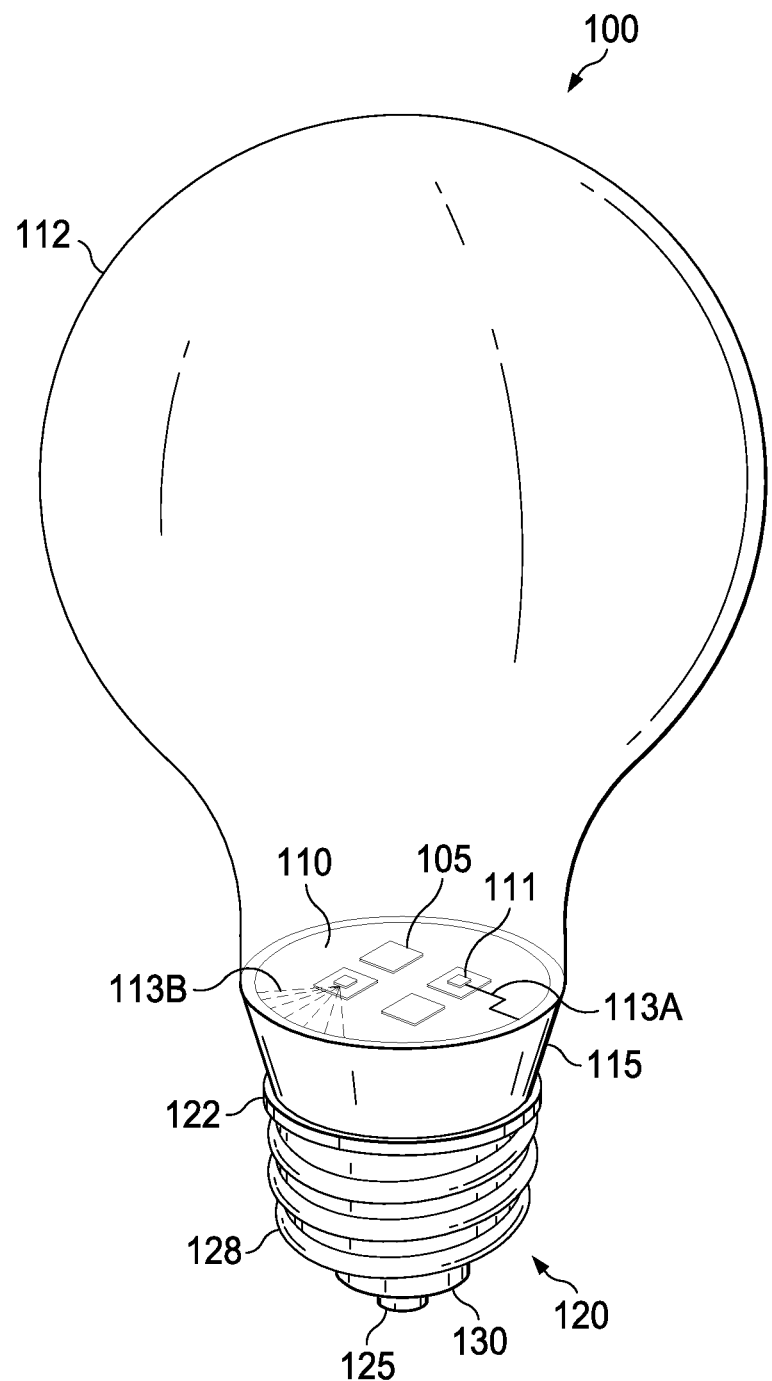
FIG. 1 illustrates an LED light bulb according to various example embodiments of the invention.

FIG. 1 illustrates an LED light bulb 100 according to various example embodiments of the invention. The LED light bulb 100 includes one or more LED packages 105 mounted on a substrate 110. Each of the LED packages 105 includes one or more LED dies (e.g., the die 111). The LED dies 111 may be manufactured according to various evolving processes and technologies, including but not limited to an organic LED process, a polymer LED process, a quantum dot LED process, a half-cycle AC LED process, and/or a process incorporating electroluminescence.

In some embodiments, the package-carrying substrate 110 may comprise a conductor-carrying electrical insulation material such as a rigid circuit board or a flex circuit, for example. In some embodiments, the LED package-carrying substrate 110 may be configured as two or more electrically isolated portions of a heat sink incorporated into the LED light bulb 100. In the latter case, the LED packages 105 may be affixed directly to the electrically isolated portions of the heat sink.

The LED light bulb 100 also includes one or more thermal conductors (e.g., the thermal conductors 113A and/or 113B). The thermal conductors 113A, 113B are coupled to the LED dies 111 to transfer heat away from the dies 111. In some embodiments, thermal conductors (e.g., the conductor 113A) may also serve as electrical connections to the dies 111, and may be configured as paths on and/or through the substrate 110. In embodiments with LED packages affixed directly to a segmented heat sink, the thermal conductors (e.g. the conductors 113B) may be embodied in the heat sink itself.

The LED light bulb 100 also includes one or more integral thermal transfer contacts (e.g., the thermal transfer contact 115). In this context, "integral" means integrated as an element of the LED light bulb 100. In some embodiments, the thermal transfer contact 115 may be formed in the shape of a band around the perimeter of the LED light bulb 100, as depicted in FIG. 1. Many other embodiments of the thermal contact 115 are contemplated by this disclosure. One or more surfaces of the thermal transfer contact 115 are configured to thermally contact a heat sink external to the LED light bulb 100. The thermal transfer contact 115 is thermally coupled to the thermal conductors 113A, 113B to transfer heat away from the LED dies 111 and to the external heat sink.

The LED light bulb 100 also includes a base 120 coupled to the thermal transfer contact 115. The base 120 may be electrically coupled to the thermal transfer contact 115 or maybe insulated therefrom by an insulator 122. The base 120 supports the LED light bulb 100 in a socket and provides electrical conductors to deliver power to the LED packages 105.

The base 120 may be configured physically and electrically to be easily installed by a consumer. Embodiments of the base 120 are configured to preclude installation into a standard 26 mm (USA E26) or 27 mm (EU E27) Edison screw base lamp socket for safety reasons. Appropriate configurations of the base 120 disclosed herein include an Edison screw base less than 26 millimeters in diameter at the envelope (smaller than E26), a base with at least one protruding prong to make electrical contact with a corresponding receptacle at the socket, or a bayonet-style base, among others.

In embodiments using a smaller-than-standard Edison screw base, the base 120 may include a central electrical contact 125. The contact 125 may be electrically insulated from threads 128 by an insulator 130. Electrical power to the LED packages 105 may be delivered via the contact 125, the threads 128, and/or the thermal transfer contact 115. In some embodiments, for example, a heat-generating cathode of the LED die 111 may be electrically connected to the thermal transfer contact 115. In the latter case, the thermal transfer contact 115 may be configured to provide an electrical connection to one or more elements of the base 120 absent the insulator 122, or to the external heat sink with the insulator 120 present.

The LED light bulb 100 also includes a light-transmissive envelope 112 extending from the thermal transfer contact 115, the base 120, or both. The envelope 112 surrounds and protects the LED packages 105 and may be used to grasp the LED light bulb 100 during installation.

The LED packages 105 may be variously positioned in LED light bulbs described herein. Factors to consider include thermal transfer of waste heat generated by the LED dies 111, delivery of electrical power, and light direction and diffusion, among others. Accordingly, the following embodiments are example implementations of structures capable of accommodating high-power LED dies by efficiently sinking large amounts of heat via transfer to an external heat sink via the heat transfer contact 115.

Figure 2:
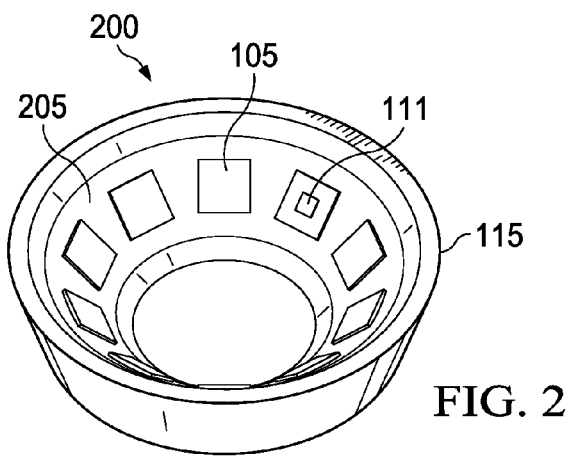
FIG. 2 illustrates a thermal transfer contact configuration including LED packages positioned at a thermal transfer contact according to various example embodiments.

FIG. 2 illustrates a thermal transfer contact configuration 200 including LED packages 105 positioned at the thermal transfer contact 115 according to various example embodiments. An LED package-carrying substrate 205 is affixed around an inner circumference of the thermal transfer contact 115. The configuration 200 provides for close thermal coupling between LED packages 105 and the thermal transfer contact 115. Heat generated by the LED dies 111 may be efficiently transferred from the LED bulb 100 to the external heat sink as a result. The beveled interior shape of the thermal transfer contact 115 positions the LED packages 105 to emit light for 360° at an upward pitch from the horizontal. The resulting light path may provide for enhanced light dispersion resembling that of an incandescent lamp.

Figure 3:
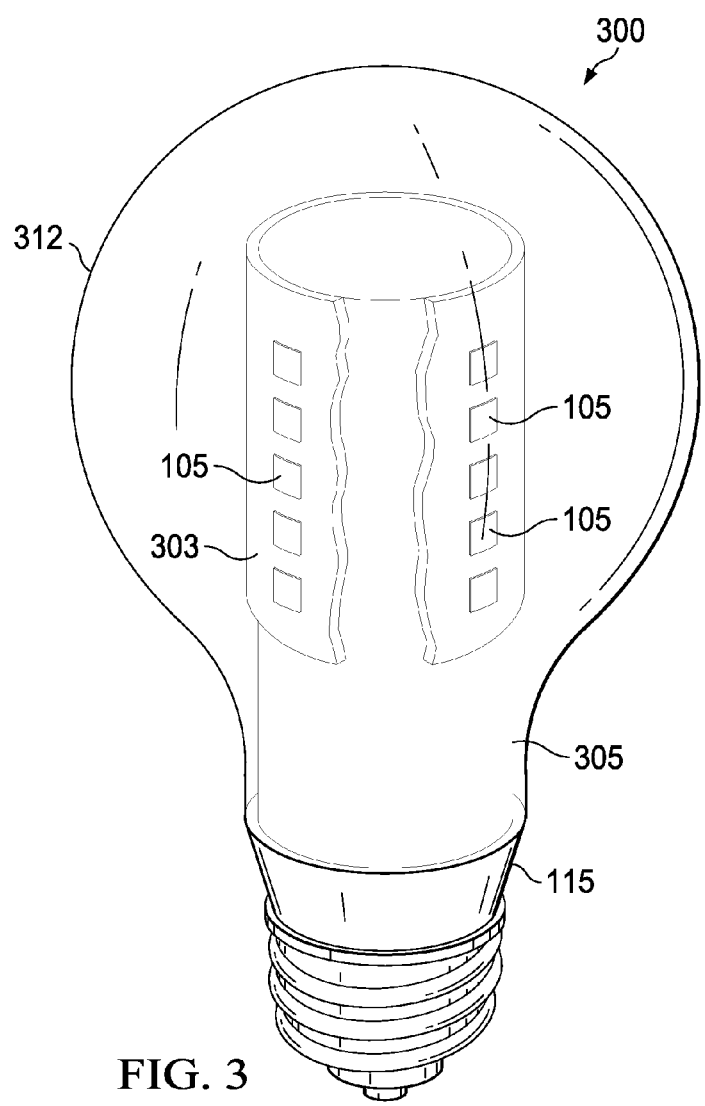
FIGS. 3-4 illustrate LED light bulbs according to various example embodiments.
Figure 4:
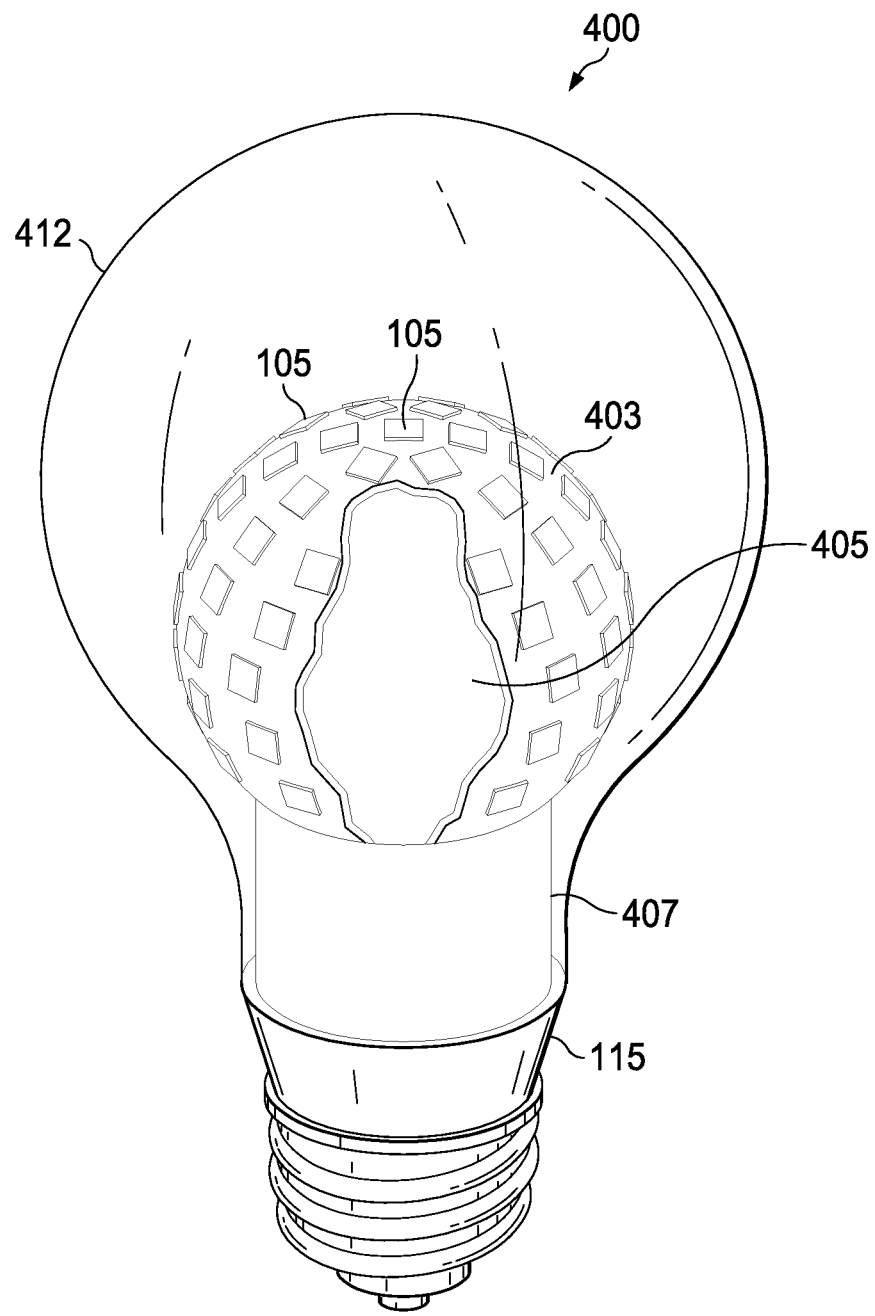

FIGS. 3-4 illustrate LED light bulbs 300 and 400 according to various example embodiments. The LED light bulb 300 includes a substantially cylindrically-shaped LED package-carrying substrate 303 affixed around a cylindrical heat sink 305. The heat sink 305 is thermally coupled to the thermal transfer contact 115. The LED packages 105 are thus thermally coupled to the thermal transfer contact 115 via the heat sink 305. In some embodiments, LED packages 105 may be affixed directly to an electrically-segmented version of the heat sink 305, as previously described with reference to FIG. 1. In some embodiments, the substrate 303 and the heat sink 305 may be enclosed by a transmissive envelope 312. The transmissive envelope 312 is adapted to accommodate the size, shape, and/or heat transfer characteristics of the LED packages 105 and the cylindrical heat sink 305.

Turning now to FIG. 4, the LED light bulb 400 includes LED package-carrying substrate 403. The substrate 403 is affixed around an ellipsoidally-shaped heat sink 405. In some embodiments, the heat sink 405 may be spherically-shaped. A cylindrical extension 407 of the heat sink 405 is thermally coupled to the thermal transfer contact 115. In some embodiments, the LED packages 105 may be affixed directly to an electrically-segmented version of the heat sink 405, as previously described with reference to FIG. 1. A transmissive envelope 412 may be adapted to accommodate the size, shape, and/or heat transfer characteristics of the LED packages 105 and the ellipsoidal heat sink 405.

Figure 5:
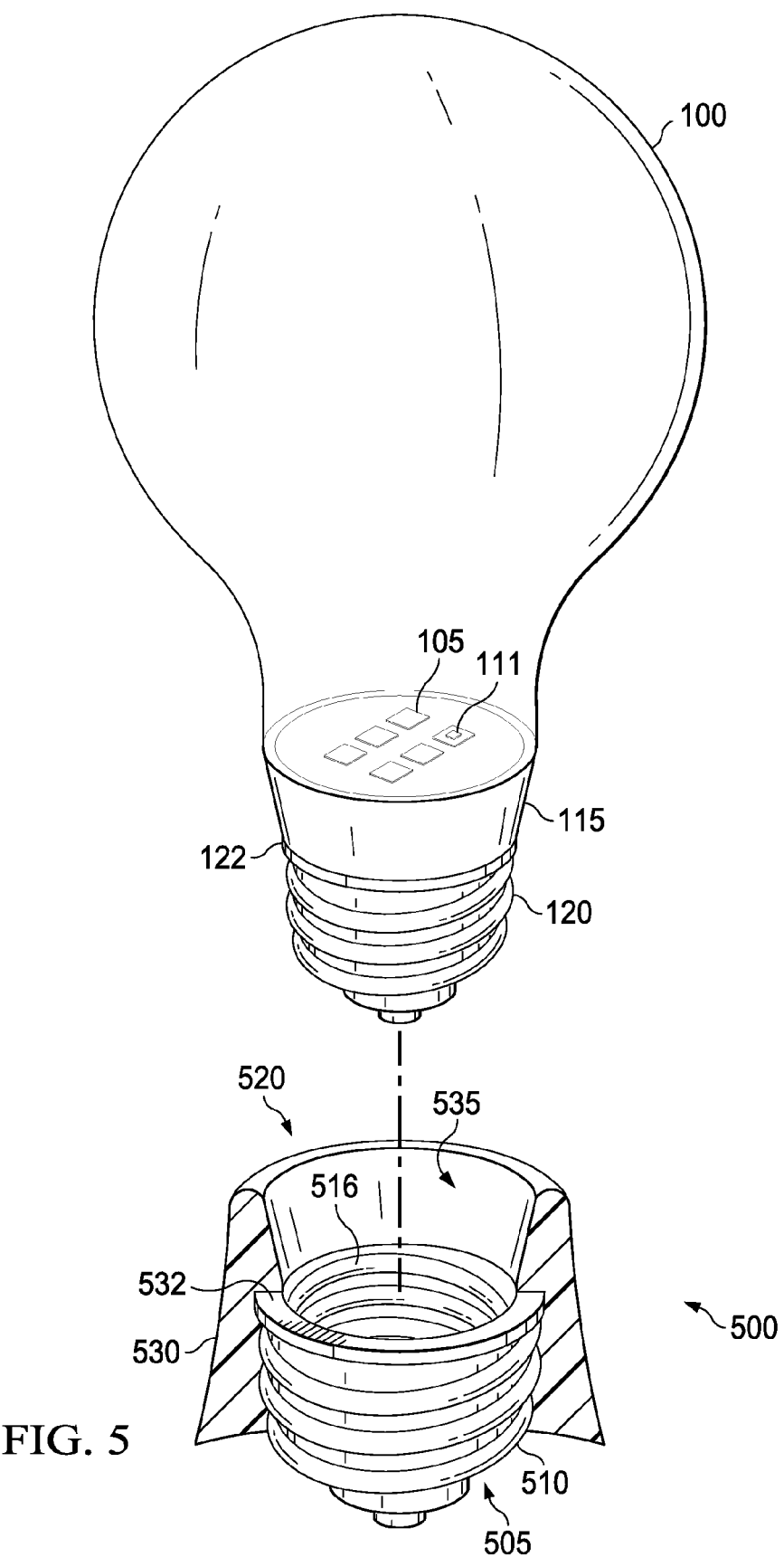
FIG. 5 illustrates an LED light bulb lamp adapter according to various example embodiments.

FIG. 5 illustrates an LED light bulb lamp adapter 500 according to various example embodiments. The lamp adapter 500 includes an adapter base 505. The adapter base 505 is adapted at a male end 510 to be installed in a standard incandescent light bulb socket. For example, the male end 510 of the adapter base 505 may be configured as an Edison screw 26 millimeter base (USA standard E26) or an Edison screw 27 millimeter base (European standard E27).

The adapter base 505 is adapted at a female end 516 to accept an LED light bulb such as the bulbs 100, 300, and 400 previously described with reference to FIGS. 1, 3, and 4 (hereinafter "LED light bulb 100"). The female end 516 of the adapter base 505 may be configured to accept an Edison screw base less than 26 millimeters in diameter (smaller than E26), a bayonet base, or a base with one or more protruding prongs to make electrical contact with a corresponding receptacle at the female end 516 of the adapter base 505.

The lamp adapter 500 also includes a heat sink. The heat sink may be configured in various shapes and sizes in various embodiments of the lamp adapter 500. For example, a heat spreader 520 may be formed as a skirt 530 surrounding the adapter base 500 and may be mechanically coupled to the adapter base 505 for support. Some embodiments of the adapter 500 may also include an insulator 532. The insulator 532 electrically isolates the heat spreader 520 from the adapter base 505. The latter embodiment may be used in conjunction with an LED light bulb 100 having a base 120 isolated from thermal transfer contact 115 by electrical isolator 122.

A surface 535 of the heat spreader 520 is capable of being thermally coupled to the thermal transfer contact 115 of the LED light bulb 100. So coupled, the heat spreader 520 sinks and dissipates heat from the LED packages 105 through the thermal transfer contact 115 when the LED light bulb 100 is installed in the adapter base 500. Configurations of the thermal transfer contact 115 and the heat spreader 520 are described herein as examples of apparatus used to separate illumination functionality from heat dissipation functionality. Doing so may improve the efficiency of either or both functions. For example, a heat sink external to the LED light bulb 100 may be larger than might be practical if integrated into the light bulb 100 and/or situated in close proximity to the LED packages 105. The entire body of a metal lamp or a portion thereof may be thermally coupled to the thermal transfer contact 115 to operate as a heat sink. Greater heat sink efficiency may allow the LED dies 111 to be over-driven to produce more light at cooler die temperatures.

Figure 6:
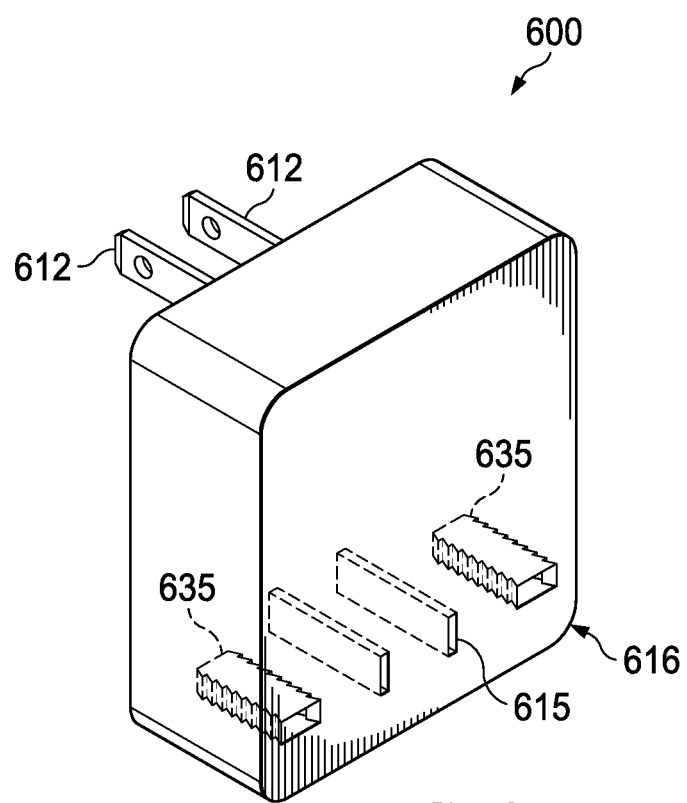
FIG. 6 illustrates a lamp adapter LED power supply module according to various example embodiments.

FIG. 6 illustrates a lamp adapter LED power supply module 600 according to various example embodiments. The power supply module 600 includes electrical contact prongs 612. The contact prongs 612 are adapted to plug into a standard electrical outlet and/or electrical extension cord, the particulars of which may very according to local jurisdiction and electrical codes. U.S. plugs and receptacles are illustrated herein as examples. The power supply module 600 is adapted to utilize AC current from an electrical outlet and to provide electrical power appropriate to power one or more LED components associated with an LED light bulb. For example, the power supply module 600 may be configured as a constant current DC source or as a half-cycle AC current source, among others and as appropriate to evolving LED technologies.

The power supply module 600 also includes an integral electrical receptacle 615. The electrical receptacle 615 is adapted to accept electrical contact prongs associated with a lamp cord plug inserted into the power supply module 600. The power supply module 600 further includes channels 635 extending into the module 600 from the module surface 616. The channels 635 are adapted to accept extension elements of a lamp plug lock-in retainer as further described below. It is noted that the power supply module 600 may be configured in various shapes and sizes as dictated by the interior volume and shape requirements of the included electrical components, consumer convenience, etc. For example, in some embodiments the electrical receptacle 615 and the lock-in channels 635 may be positioned along a side face of the module 600 rather than along the broad face as depicted in FIG. 6.

FIG. 7 illustrates a lamp adapter LED power supply assembly 700 according to various example embodiments. The power supply assembly 700 includes the power supply module 600 as previously described. The assembly 700 also includes a lock-in device 725. The lock-in device 725 is adapted to couple to the power supply module 600 and to a lamp cord plug 715 inserted into the power supply module 600. The lock-in device 725 prevents retraction of the lamp cord plug 715 from the power supply module 600.

In some embodiments, the lock-in device 725 may include a lateral portion 728. The lateral portion 728 is coupled to one end of each of two or more retainer extensions 730. The lateral portion 728 supports and maintains spacing between the retainer extensions 730. The retainer extensions 730 are adapted to surround a portion of the lamp cord plug 715 and are capable of insertion into the lock-in channels 635 integrated into the power supply module 600. The lateral portion 728 abuts the lamp cord plug 715 to inhibit extraction of the lamp cord plug 715 following initial insertion of the retainer extensions 730 into the lock-in channels 635.

In some embodiments, the lock-in device retainer extensions 730 may include serrations along one or more edges and along corresponding edges of the lock-in channels 635. The serrations may be formed into substantially sawtooth shapes. Such arrangement may facilitate insertion of the lock-in device retainer extensions 730 into the lock-in channels 635 and inhibit removal of the lamp cord plug 715 from the power supply 600 once inserted.

FIG. 8 illustrates an LED lamp plug lock-in device 725 according to various example embodiments. In some embodiments, the lock-in device 725 may be formed in a clamshell configuration (e.g., injection molded) to facilitate installation around the lamp cord 720 of FIG. 7 prior to insertion into the lock-in channels 635. The two portions of the clamshell may be joined by a hinge 810 (e.g., a molded plastic extension of each of the two portions). The two portions may also each include a channel 815 to fit around the lamp cord 720.

An incandescent to LED lamp conversion kit may be packaged to include one or more of the LED light bulbs 100 previously described with reference to FIGS. 1-4. LED light bulbs in the conversion kit are adapted to be installed in LED light bulb lamp adapters 500 previously described with reference to FIG. 5. A lamp adapter 500 from the conversion kit is adapted for installation in an incandescent lamp in place of an incandescent bulb. Waste heat from an LED light bulb installed from the conversion kit is transferred through a thermal transfer contact 115 integral to the LED bulb to a heat sink portion 520 of the lamp adapter 500, as previously described with reference to FIG. 5. A lamp-adaptable LED power supply assembly 700 as described with reference to FIGS. 6-8 is also included in the conversion kit. An LED power supply module 600 is adapted to plug into a standard electrical outlet. The power supply 600 is also adapted to lock in a lamp cord plug 715 inserted into the LED power supply module 600 and to supply appropriate power to the LED light bulb(s).

Modules and components described herein may include hardware circuitry, optical components, single or multi-processor circuits, memory circuits, and/or articles of manufacture including computer-readable media with computer instructions encoded therein/thereon capable of being executed by a processor, and including non-volatile memory with firmware stored therein (but excluding non-functional descriptive matter), and combinations thereof, as desired by the architects of the LED light bulbs 100, 300, 400, the lamp adapter 500, the LED power supply assembly 700, and as appropriate for particular implementations of various embodiments.

Apparatus and systems described herein may be useful in applications other than incandescent to LED lamp conversion. Other applications may exist for the LED light bulbs 100, 300, 400, for the lamp adapter 500, and for the LED power supply assembly 700. Examples of these apparatus described herein are intended to provide a general understanding of the structures of various embodiments. They are not intended to serve as complete descriptions of all elements and features of apparatus and systems that might make use of these structures.

Apparatus and methods described herein separate the functions of light emission, heat dissipation, and power conversion in LED lighting. Doing so may facilitate cost-effective LED lighting and enable the conversion of existing incandescent lamps to LED service. An LED light bulb includes a thermal transfer contact to transfer LED die-generated heat to a heat sink external to the bulb. A lamp adapter safely routes power from a lamp adaptable LED power supply through the lamp to the LED light bulb.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description; with each claim him standing on its own as a separate embodiment.

What is claimed is:

1. A lamp adaptable LED power supply assembly, comprising:
 a power supply module capable of electrical connection to at least one of an electrical outlet or an electrical extension cord plugged into the electrical outlet, the power supply module adapted to utilize AC current from the electrical outlet and to provide electrical power appropriate to at least one LED component of an LED light bulb;
 an electrical receptacle component of the power supply module to accept electrical contact prongs associated with a lamp cord plug; and
 a lock-in device to couple to the lamp cord plug and to the power supply module to prevent retraction of the lamp cord plug from the power supply module, the lock-in device further comprising:
 at least two retainer extensions to surround at least a portion of the lamp cord plug and capable of insertion into lock-in channels situated within the power supply module; and
 a lateral portion coupled to one end of each of the retainer extensions to support and maintain spacing between the retainer extensions and to abut the lamp cord plug to inhibit extraction of the lamp cord plug from the power supply module following insertion of the retainer extensions into the lock-in channels.

2. The lamp adapter LED power supply assembly of claim 1, the power supply module configured to provide at least one of a constant DC current or a half-cycle AC current.

3. The lamp adapter LED power supply assembly of claim 1, further comprising:
 serrations situated along at least one edge of each of the two retainer extensions and along corresponding edges of the lock-in channels to inhibit removal of the retainer extensions.

4. The lamp adapter LED power supply assembly of claim 1, the lock-in device formed in a clamshell configuration to facilitate installation around the lamp cord prior to insertion into the lock-in channels.

5. The lamp adaptable LED power supply of claim 1 further comprising a light emitting diode (LED) light bulb including at least one LED package mounted on a substrate to support an LED die, at least one thermal conductor coupled to the LED die to transfer heat away from the LED die, and a thermal transfer contact thermally coupled to the thermal conductor, at least one surface of the thermal transfer contact configured to thermally contact a heat sink external to the LED light bulb; and
 an LED light bulb lamp adapter including an adapter base configured for installation in an incandescent light bulb socket to accept the LED light bulb and a heat spreader mechanically coupled to the adapter base for support, the heat spreader capable of thermal coupling to the thermal transfer contact to sink and dissipate heat from the LED light bulb when the LED light bulb is operating in the adapter base.

6. A lamp adaptable LED power supply assembly, comprising:
 a power supply module external to an existing lamp capable of electrical connection to at least one of an electrical outlet or an electrical extension cord plugged into the electrical outlet, the power supply module adapted to utilize AC current from the electrical outlet and to provide electrical power appropriate to at least one LED component of an LED light bulb;
 an electrical receptacle component of the power supply module to accept electrical contact prongs associated with an existing lamp cord plug; and
 a lock-in device to couple to the lamp cord plug and to the power supply module to prevent retraction of the lamp cord plug from the power supply module.

* * * * *